No. 650,316. Patented May 22, 1900.
H. R. HAMER.
VEHICLE AXLE NUT.
(Application filed Jan. 26, 1900.)
(No Model.)
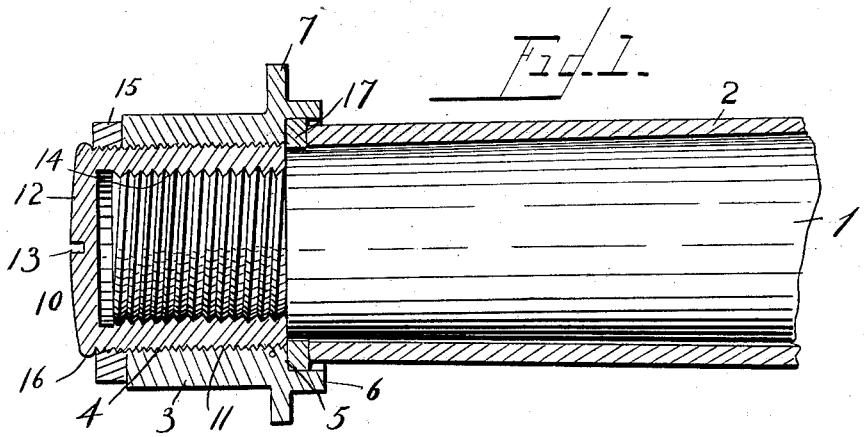
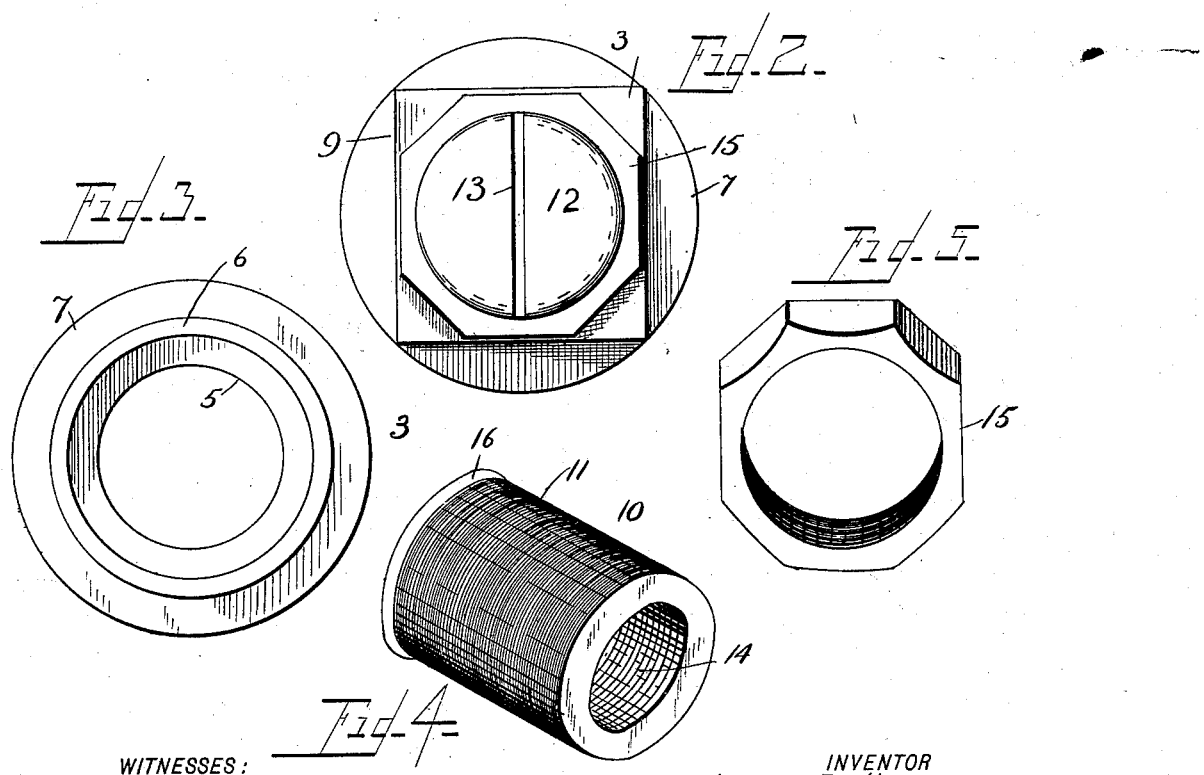
WITNESSES:
Franck L. Ourand.
E. R. Bunyer.
INVENTOR
Harry R. Hamer.
BY
Louis Bagger & Co.,
ATTORNEYS.

UNITED STATES PATENT OFFICE.

HARRY R. HAMER, OF NORTH ADAMS, MASSACHUSETTS.

VEHICLE-AXLE NUT.

SPECIFICATION forming part of Letters Patent No. 650,316, dated May 22, 1900.

Application filed January 26, 1900. Serial No. 2,895. (No model.)

*To all whom it may concern:*

Be it known that I, HARRY R. HAMER, a citizen of the United States, residing at North Adams, in the county of Berkshire and State of Massachusetts, have invented new and useful Improvements in Vehicle-Axle Nuts, of which the following is a specification.

My invention relates to vehicle-axle nuts; and among the objects of the same are to provide simple and efficient means for taking up the wear of the axle-box as occasion may require and to provide a take-up nut which may be applied to old or new axles without alteration of any of the parts and which may be readily adjusted or tightened as wear occurs on the box or skein without removal of any of the parts of the wheel or axle.

Another object is to provide a take-up nut which can be substituted for an old nut on a vehicle-axle and one which can be quickly set to compensate for further wear as it occurs.

I attain these objects by means of the construction shown in the accompanying drawings, which form a part of this specification, and in which—

Figure 1 is a longitudinal section of the end portion of an axle and skein and showing a take-up nut made in accordance with my invention applied thereto. Fig. 2 is an outer end view of the same. Fig. 3 is a view of the inner end of the axle-nut. Fig. 4 is a perspective view of the bushing. Fig. 5 is a perspective view of the locking-nut.

Like numerals of reference designate like parts wherever they occur in the different views of the drawings.

In said drawings, 1 is an axle-spindle, and 2 is the skein, both of which are of ordinary construction, the spindle having its outer end threaded, as usual. The interior diameter of the nut 3 is substantially the same as the smooth part of the axle, and said nut 3 is interiorly screw-threaded at 4 and is provided with a shoulder 5, a cylindrical flange 6, and an outwardly-extending flange 7, all integral with the nut. The portion 9 of the nut may be rectangular or of polygonal form, and the threads 4 are of slow pitch or fine. Fitted within the threaded portion of the nut 3 is a bushing 10, having a screw-thread 11 of the same pitch as the thread 4. The bushing is in the form of a cap-nut—that is to say, it is provided with a closed outer end 12, having a groove 13 for application of a screw-driver or similar tool for adjusting it, and it is also provided with a threaded socket 14, the threads of which correspond with those on the end of the axle-spindle.

A locking-nut 15, whose interior diameter is the same as the nut 3, has an interior screw-thread of the same pitch as those 11 on the bushing 10 and those 4 within the nut 3 and is fitted to the outer surface of the bushing. A plain unthreaded portion 16 on the outer end of the bushing prevents the locking-nut 15 from running off the bushing. The outer surface of the locking-nut 15 may be octagonal or of other contours. A leather washer 17 may be placed between the outer end of the skein 2 and the shoulder 5 on the nut 3.

To assemble the parts of my take-up nut, the locking-nut 15 is placed on the threaded end of the bushing 10 and turned until it is stopped by the unthreaded portion 16. The bushing is then screwed into the nut 3 until it is near the locking-nut 15, and said locking-nut is then tightened up against nut 3. A leather washer 17 is now placed in the nut 3 against the shoulder 5, and the take-up nut is then ready to be applied to an axle as an ordinary nut. When the end of the skein has become worn and is shorter than the axle and it becomes necessary to compensate for wear, the locking-nut 15 is loosened and the nut 3 is turned inward over the smooth part of the axle to bear against the washer 17 and the skein. The locking-nut 15 is then tightened up against nut 3 and the adjustment is complete. The take-up nut may then be taken off and put on as an ordinary nut.

It will be obvious from the foregoing that my take-up nut may be applied to old or new work, as the interior thread in the bushing is made of the required pitch to fit the threads of axle-spindles of the ordinary or usual pitch, and the other parts of my device are made to conform to the size and contour of the bushing. It will also be apparent that my device is capable of considerable range of adjustment to take up wear, and that when the adjustment has been made the parts are held firmly in place and cannot be lost, as the nut is prevented from turning off by the locking-nut, and the locking-nut is prevented from coming off by the plain unthreaded portion 16 on the bushing. It will also be seen that my device is compact, of few parts, and of simple construction.

Having thus fully described my invention, what I claim is—

1. A take-up nut for vehicle-axles, comprising a bushing in the form of a cap-nut the diameter of which, where exteriorly threaded, is of the same size as the smooth part of the axle where it is applied, said bushing being interiorly threaded to fit the end of the axle and exteriorly threaded to receive a locking-nut and a nut, the same thread answering for both the locking-nut and nut, a nut fitted upon said bushing, and a locking-nut adjustable on said bushing to lock the nut and bushing at any point of adjustment, substantially as described.

2. A take-up nut for vehicle-axles, comprising a bushing having an interior screw-thread to fit the end of the axle-spindle, a groove in the outer end of the bushing to insert a screw-driver, and a threaded exterior surface, a nut fitted to said exterior surface, the interior diameter of said nut being the same size as the smooth part of the axle, a locking-nut, the interior diameter of which is the same size as the interior diameter of the nut, said locking-nut being also fitted to the exterior surface of said bushing to hold the bushing and nut in adjusted position, the outer end of the bushing being plain or unthreaded to prevent detachment of the locking-nut and nut, substantially as described.

In testimony whereof I have hereunto set my hand in presence of two subscribing witnesses.

HARRY R. HAMER.

Witnesses:
E. P. BUNYEA,
BENNETT S. JONES.